United States Patent
Lee et al.

(10) Patent No.: US 7,688,543 B2
(45) Date of Patent: Mar. 30, 2010

(54) DEVICE TO REGENERATE A DESICCANT IN A HARD DISK DRIVE

(75) Inventors: SungChang Lee, San Jose, CA (US); Brian D. Strom, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 663 days.

(21) Appl. No.: 11/650,229

(22) Filed: Jan. 5, 2007

(65) Prior Publication Data
US 2008/0165447 A1  Jul. 10, 2008

(51) Int. Cl.
*G11B 33/14* (2006.01)
(52) U.S. Cl. .................................................. 360/97.02
(58) Field of Classification Search .... 360/97.01–97.04
See application file for complete search history.

(56) References Cited

U.S. PATENT DOCUMENTS 4,959,976 A * 10/1990 Matsuda et al. ................ 62/271
7,466,514 B2 * 12/2008 Brown et al. ............. 360/97.02

* cited by examiner

*Primary Examiner*—A. J. Heinz
(74) *Attorney, Agent, or Firm*—Ben J. Yorks; Irell & Manella LLP

(57) ABSTRACT

A disk drive that regenerates a desiccant within the drive. The drive includes a housing that encloses a head and a disk. A first desiccant is located adjacent to a hole of the housing. A second desiccant is coupled to the first desiccant. The second desiccant is also coupled to a source of heat. Heat is transferred through the second desiccant to the first desiccant. The heat evaporates fluid within the first desiccant. The evaporated fluid flows into and through the second desiccant. The evaporation of fluid regenerates the first desiccant so that is can continuously absorb humidity within the drive.

6 Claims, 3 Drawing Sheets

DEVICE TO REGENERATE A DESICCANT IN A HARD DISK DRIVE

BACKGROUND OF THE INVENTION

1. Field of the Invention

The present invention relates to an apparatus and method for regenerating a desiccant of a hard disk drive.

2. Background Information

Hard disk drives have a housing that encloses the various components of the drive. The housing provides protection from handling and various environmental factors. The housing typically has a seal to prevent contaminants from flowing into the drive. It is difficult to completely seal a disk drive. Consequently, air flows into the drive under certain ambient conditions. This flow of air may introduce humidity within the drive. Additionally, humidity may form inside the housing with a reduction in ambient temperature.

Some of the drive components are sensitive to humidity. A increase in humidity within the housing may degrade the performance of the drive. To compensate for humidity some drives include a desiccant located next to a breather hole in the housing. The breather hole allows a flow of air into the drive. The desiccant absorbs any humidity with the air flow. Additionally, the desiccant can absorb humidity that forms within the disk drive. The desiccant can become saturated with fluid. Once saturated the desiccant is unable to absorb additional humidity. It would be desirable to regenerate the desiccant so that it can continuously absorb moisture.

BRIEF SUMMARY OF THE INVENTION

A hard disk drive that is coupled to a source of heat. The disk drive includes a housing that encloses a disk and a head. The drive further has a first desiccant located adjacent to a housing opening and a second desiccant coupled to the first desiccant and the source of heat.

DETAILED DESCRIPTION

Disclosed is a disk drive that regenerates a desiccant within the drive. The drive includes a housing that encloses a head and a disk. A first desiccant is located adjacent to a hole of the housing. A second desiccant is coupled to the first desiccant. The second desiccant is also coupled to a source of heat. Heat is transferred through the second desiccant to the first desiccant. The heat evaporates fluid within the first desiccant. The evaporated fluid flows into and through the second desiccant. The evaporation of fluid regenerates the first desiccant so that is can continuously absorb humidity within the drive.

Figure 1:
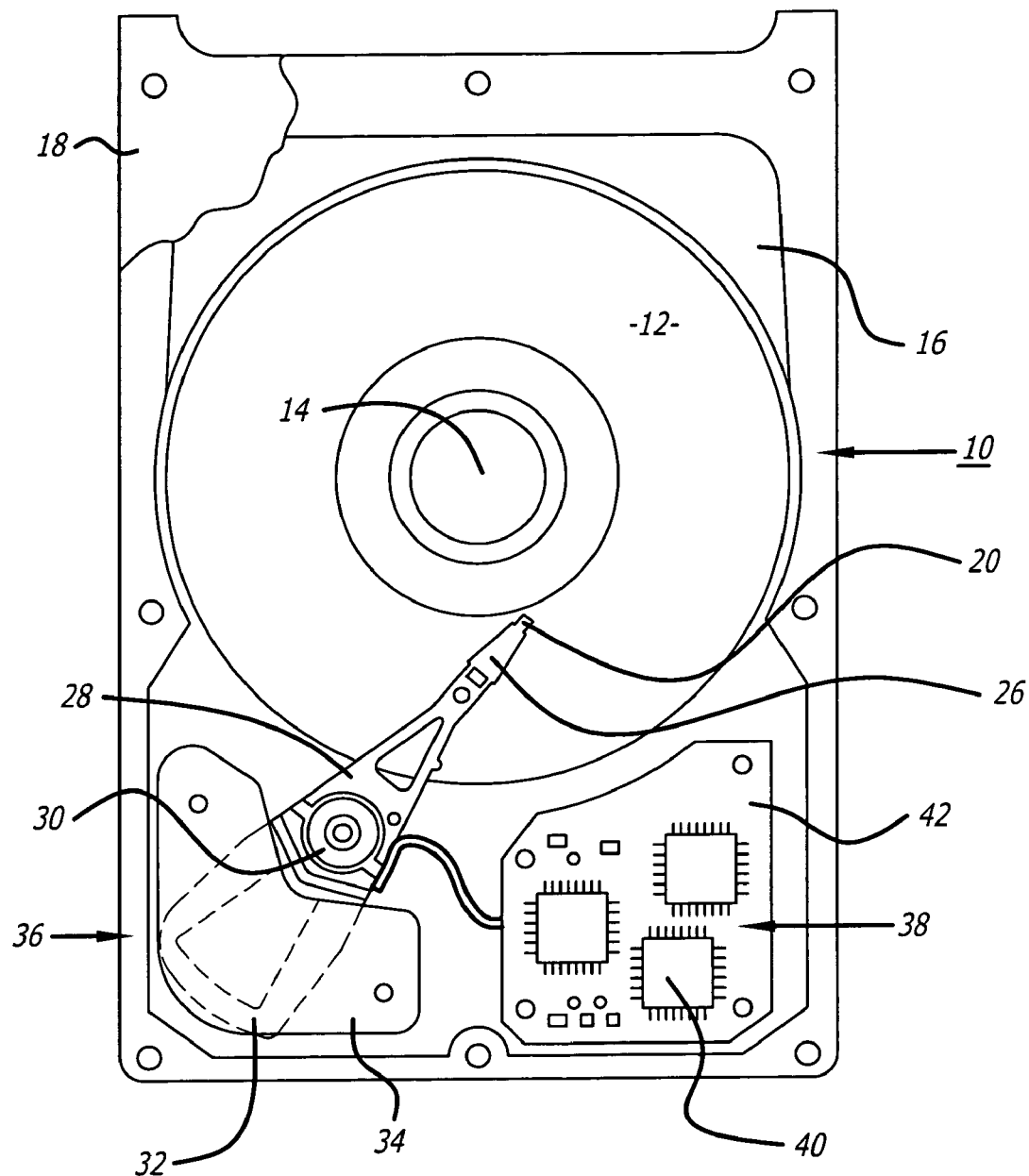
FIG. 1 is a top view of an embodiment of a hard disk drive.

Referring to the drawings more particularly by reference numbers, FIG. 1 shows an embodiment of a hard disk drive 10 with the various internal components of the drive. The disk drive 10 may include one or more magnetic disks 12 that are rotated by a spindle motor 14. The spindle motor 14 may be mounted to a base plate 16. The disk drive 10 may further have a cover 18 that encloses the disks 12. The cover 18 and base plate 16 together define a housing.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figures 2, 3:
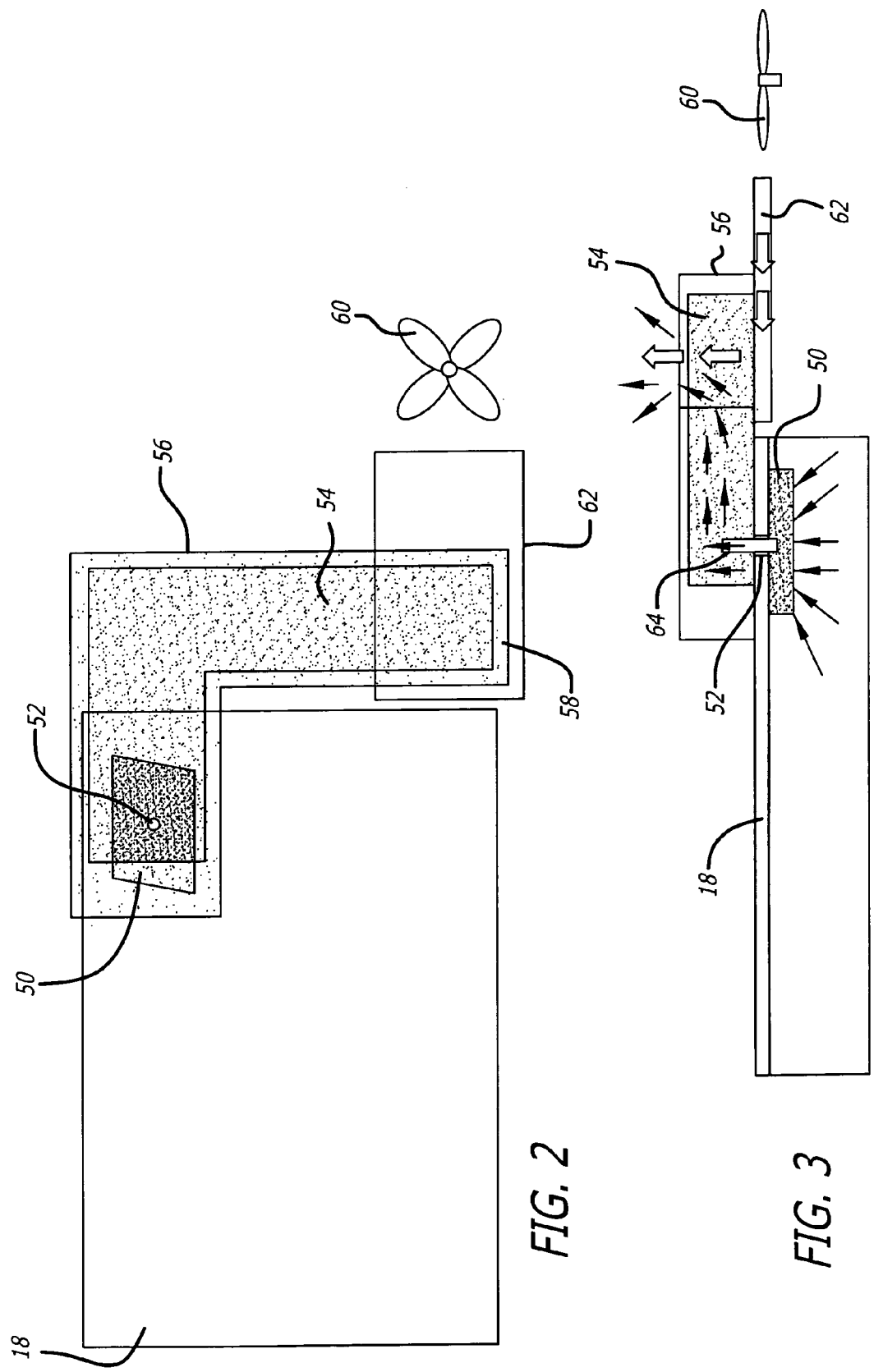
FIG. 2 is a top view of an illustration of a drive with a second desiccant.
FIG. 3 is a side view of the drive shown in FIG. 2.

As shown in FIGS. 2 and 3 the drive 10 includes a first desiccant 50 located adjacent to a breather hole 52 within the cover plate 18. The desiccant 50 is constructed from a material that absorbs fluid such as water vapor.

A second desiccant 54 is coupled to the first desiccant 50. The second desiccant 54 is constructed from a material that can both absorb and transfer fluid. The second desiccant is preferably larger than the first desiccant to hold a significant amount of fluid. The second desiccant 54 can be enclosed within a desiccant housing 56. The desiccant housing 56 may have an air passage 58 that is coupled to an external source of heat 60. The external heat source 60 may be the fan of a computer that pushes air at a relatively elevated temperature into the passage 58 through a duct 62 and applies heat through convection.

The hot air applies heat to the second desiccant 54 and housing 56. The heat transfers into the first desiccant 50. The heat elevates the temperature of the first desiccant 50 to evaporate any fluid therein. The evaporated fluid flows into the second desiccant 54. A tube 64 may be connected to the desiccants 50 and 54 to facilitate the flow of the evaporated fluid into the second desiccant 54. The fluid can flow into the second desiccant 54 and be removed in the passage 58 by the air flow through convection. The second desiccant 54 and housing 56 function as a heat pipe that extract fluid from the first desiccant 50. The housing 56 may also have a capillary material that facilitates the flow of fluid. Evaporating the fluid regenerates the first desiccant 50 so that the desiccant 50 can continuously absorb moisture.

Figure 4:
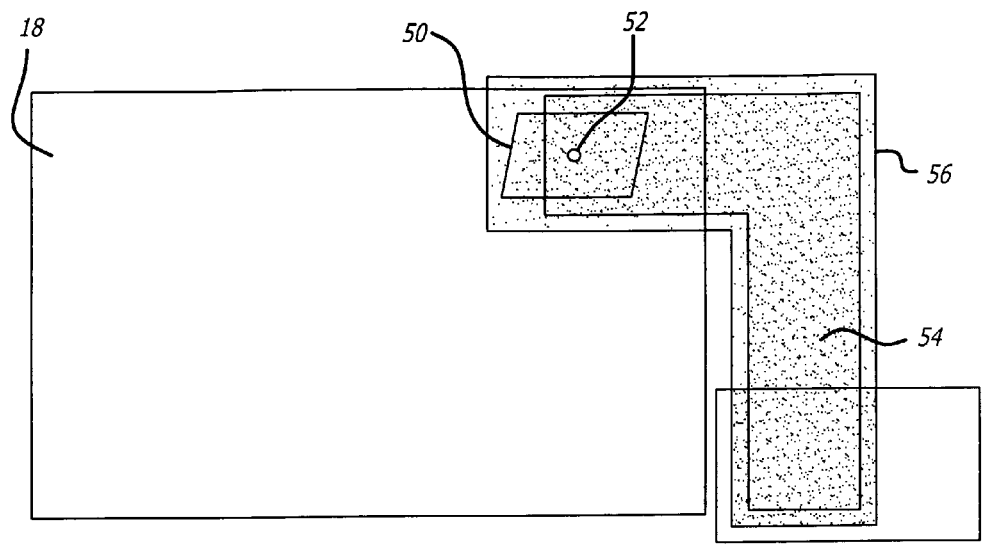
FIG. 4 is a top view of an illustration of an alternate embodiment of disk drive with a conductive heat path.
Figure 5:
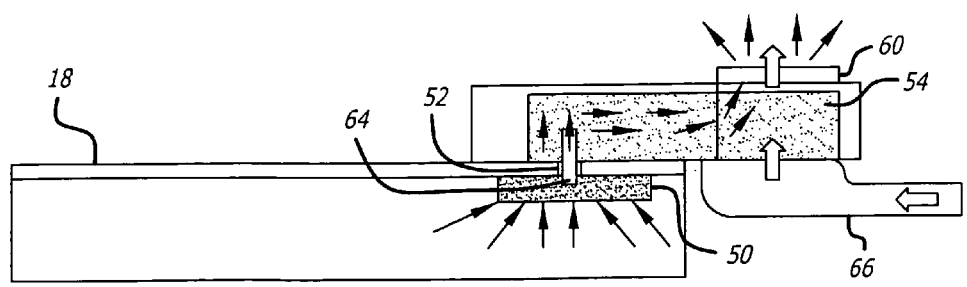
FIG. 5 is a side view of the drive shown in FIG. 4.

FIGS. 4 and 5 show an alternate embodiment wherein heat is applied by conduction. The heat may be applied through a plate 66 attached to the desiccant housing 56. The plate 66 may be attached to a heat sink of a computer or some other source of heat.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive that is coupled to a source of heat, comprising:
   a disk;
   a head coupled to said disk;
   a housing that encloses said disk and said head, said housing having an opening;
   a first desiccant located within said housing adjacent to said opening; and,
   a second desiccant that is fluidly coupled to said first desiccant and thermally coupled to the source of heat.

2. The disk drive of claim 1, wherein said second desiccant is located outside said housing.

3. The disk drive of claim 1, further comprising a desiccant housing coupled to said second desiccant.

4. The disk drive of claim 3, wherein said desiccant housing includes an air flow passage.

5. The disk drive of claim 1, wherein said second desiccant is larger than said first desiccant.

6. The disk drive of claim 1, further comprising a tube connected to said first and second desiccants.

* * * * *